United States Patent
Vos et al.

(10) Patent No.: US 12,032,117 B2
(45) Date of Patent: Jul. 9, 2024

(54) WEATHER/CLIMATE MODEL FORECAST BIAS EXPLAINABILITY

(71) Applicant: INTERNATIONAL BUSINESS MACHINES CORPORATION, Armonk, NY (US)

(72) Inventors: Etienne Eben Vos, Johannesburg (ZA); Zubeida Patel, Johannesburg (ZA); Thabang Mathonsi, Johannesburg (ZA); Sibusisiwe Audrey Makhanya, Pretoria (ZA)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 17/653,744

(22) Filed: Mar. 7, 2022

(65) Prior Publication Data

US 2023/0280495 A1 Sep. 7, 2023

(51) Int. Cl.
*G01W 1/10* (2006.01)
*G06N 3/045* (2023.01)
*G06N 3/049* (2023.01)
*G06N 3/084* (2023.01)

(52) U.S. Cl.
CPC .............. *G01W 1/10* (2013.01); *G06N 3/045* (2023.01); *G06N 3/049* (2013.01); *G06N 3/084* (2013.01)

(58) Field of Classification Search
None
See application file for complete search history.

(56) References Cited

U.S. PATENT DOCUMENTS

| | | | |
|---|---|---|---|
| 9,568,519 B2 | 2/2017 | Hwang | |
| 10,318,558 B2 | 6/2019 | Cipriani | |
| 10,613,252 B1 | 4/2020 | Mecikalski | |
| 10,705,255 B2 | 7/2020 | Yuzhakov | |
| 2016/0042292 A1 | 2/2016 | Caplan | |
| 2017/0299772 A1 | 10/2017 | Yuzhakov | |
| 2017/0329048 A1* | 11/2017 | Lemos | G06F 17/18 |
| 2020/0132884 A1* | 4/2020 | Rothenberg | G06N 5/04 |
| 2021/0110313 A1 | 4/2021 | Jones | |

(Continued)

FOREIGN PATENT DOCUMENTS

| | | |
|---|---|---|
| KR | 102065280 B1 | 2/2020 |
| WO | 2020131187 A2 | 6/2020 |

OTHER PUBLICATIONS

V. B. Nikam and B. B. Meshram, "Modeling Rainfall Prediction Using Data Mining Method: A Bayesian Approach," 2013 Fifth International Conference on Computational Intelligence, Modelling and Simulation, Seoul, Korea (South), 2013, pp. 132-136, doi: 10.1109/CIMSim.2013.29. (Year: 2013).*

(Continued)

*Primary Examiner* — Raymond L Nimox
(74) *Attorney, Agent, or Firm* — Douglas M. Crockatt

(57) ABSTRACT

A method, computer program, and computer system are provided for identifying bias in weather models. Data corresponding to one or more forecasts associated with a weather model is received. One or more forecast errors in the received data are identified. A forecast bias is determined from among the one or more forecast errors based on determining a presence of consistent errors in a plurality of regions associated with the received data over a period of time. The weather model is updated based on minimizing the determined forecast bias.

17 Claims, 7 Drawing Sheets

(56) References Cited

U.S. PATENT DOCUMENTS

| | | | | |
|---|---|---|---|---|
| 2021/0326723 | A1* | 10/2021 | Kumar | G06N 5/04 |
| 2022/0003894 | A1* | 1/2022 | Shapiro | G01W 1/10 |
| 2022/0180274 | A1* | 6/2022 | Makhija | G06F 16/2365 |

OTHER PUBLICATIONS

Wolff, Stefan, Fearghal O'Donncha, and Bei Chen. "Statistical and machine learning ensemble modelling to forecast sea surface temperature." Journal of Marine Systems 208 (2020): 103347. (Year: 2020).*

Haupt et. al.. Towards implementing artificial intelligence post-processing in weather and climate: proposed actions from the Oxford 2019 workshop. Philos Trans A Math Phys Eng Sci. Apr. 5, 2021;379(2194):20200091. doi: 10.1098/rsta.2020.0091. Epub Feb. 15, 2021. PMID: 33583264; PMCID: PMC7898128. (Year: 2021).*

Addor, "Propagation of Biases in Climate Models From the Synoptic to the Regional Scale: Implications for Bias Adjustment," Journal of Geophysical Research: Atmospheres, Feb. 2016, ResearchGate, 16 pgs.

Alexandrovsky, et al., "Back to the Future—A Deep Learning Framework for Bias Correction in CMIP6 Models," AI for Climate Hackthon 2021—Extreme Events Challenge, Jan. 2021, 12 pgs.

Cho, et al., Comparative Assessment of Various Machine Learning-Based Bias Correction Methods for Numerical Weather Prediction Model Forecasts of Extreme Air Temperatures in Urban Areas, Earth and Space Science, 7, e2019EA000740, Accepted Feb. 8, 2020, 18 pgs., https://doi.org/10.1029/2019EA000740.

Kim, et al., "Deep Learning for Bias Correction of MJO Prediction," Nature Communications, 2021, 12:3087, 7 pgs., https://doi.org/10.1038/s41467-021-23406-3.

King, et al., "Application of Machine Learning Techniques for Regional Bias Correction of SWE Estimates in Ontario, Canada," Hydrology and Earth System Sciences, Jan. 8, 2020, 26 pgs, https://doi.org/10.5194/hess-2019-593.

Li, et al., "Bias Correction of Monthly Precipitation and Temperature Fields from Intergovernmental Panel on Climate Change AR4 Models Using Equidistant Quantile Matching," Journal of Geophysical Research, vol. 115, D10101, 20 pgs., doi: 10.1029/2009JD012882, 2010.

Mcginnis, et al., A New Distribution Mapping Technique for Climate Model Bias Correction. In: Lakshmanan et al., (eds) Machine Learning and Data Mining Approaches to Climate Science, pp. 91-99, Springer, Cham, Springer Link, 2015, [accessed Jan. 13, 2022], 5 pgs., https://doi.org/10.1007/978-3-319-17220-0_9.

Mell et al., "The NIST Definition of Cloud Computing", National Institute of Standards and Technology, Special Publication 800-145, Sep. 2011, pp. 1-7.

Nathaniel, et al., "Bias Correction of Global Climate Model Using Machine Learning Algorithms to Determine Meteorological Variables in Different Tropical Climates of Indonesia," AI for Earth Sciences Workshop at Neural Information Processing Systems Online Conference, 2020, 10 pgs.

Peng, et al., "A Novel Approach to Improve Numerical Weather Prediction Skills By Using Anomaly Integration and Historical Data," J. Geophys. Res. Atmos., vol. 118, pp. 8814-8826, Published Aug. 20, 2013, doi:10.1002/grd.50682.

Schultz, et al., "Can Deep Learning Beat Numerical Weather Prediction?" Phil. Trans. R. Soc. A379:20200097, https://doi/10.1098/rsta.2020.0097, Accepted Sep. 3, 2020, 22 pgs.

Tan, et al., "Projected Changes of Typhoon Intensity in a Regional Climate Model: Development of a Machine Learning Bias Correction Scheme," International Journal of Climatology, RMetS, Wiley, Dec. 27, 2020, 4 pgs., https://rmets.onlinelibrary.wiley.com/doi/full/10.1002/joc.6987.

Watt-Meyer, et al., "Correcting Weather and Climate Models by Machine Learning Nudged Historical Simulations," Geophysical Research Letters, 48, e2021GL092555, Accepted Jun. 30, 2021, 10 pgs., https://doi.prg/10.1029/2021GL092555.

Xu, et al., "Improving the North American Multi-model Ensemble (NMME) Precipitation Forecasts at Local Areas Using Wavelet and Machine Learning," Climate Dynamics, Jul. 2019, Springer-Verlag, 16 pgs.

* cited by examiner

WEATHER/CLIMATE MODEL FORECAST BIAS EXPLAINABILITY

FIELD

This disclosure relates generally to field of computing, and more particularly to machine learning.

BACKGROUND

Weather and climate models use quantitative methods to simulate the interactions of the important drivers of climate, including atmosphere, oceans, land surface and ice. They are used for a variety of purposes from study of the dynamics of the climate system to projections of future climate. For example, weather and climate models may use oceanic and atmospheric data from a variety of sources, including weather station data, satellite data, forcing factors, boundary conditions, and reanalysis data to generate forecasts.

SUMMARY

Embodiments relate to a method, system, and computer readable medium for identifying, explaining, and correcting biases in weather forecasts. According to one aspect, a method for identifying bias in weather models is provided. The method may include receiving data corresponding to one or more forecasts associated with a weather model. One or more forecast errors in the received data are identified. A forecast bias is determined from among the one or more forecast errors based on determining a presence of consistent errors in a plurality of regions associated with the received data over a period of time. The weather model is updated based on minimizing the determined forecast bias.

According to another aspect, a computer system for identifying bias in weather models is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving data corresponding to one or more forecasts associated with a weather model. One or more forecast errors in the received data are identified. A forecast bias is determined from among the one or more forecast errors based on determining a presence of consistent errors in a plurality of regions associated with the received data over a period of time. The weather model is updated based on minimizing the determined forecast bias.

According to yet another aspect, a computer readable medium for identifying bias in weather models is provided. The computer readable medium may include one or more computer-readable storage devices and program instructions stored on at least one of the one or more tangible storage devices, the program instructions executable by a processor. The program instructions are executable by a processor for performing a method that may accordingly include receiving data corresponding to one or more forecasts associated with a weather model. One or more forecast errors in the received data are identified. A forecast bias is determined from among the one or more forecast errors based on determining a presence of consistent errors in a plurality of regions associated with the received data over a period of time. The weather model is updated based on minimizing the determined forecast bias.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
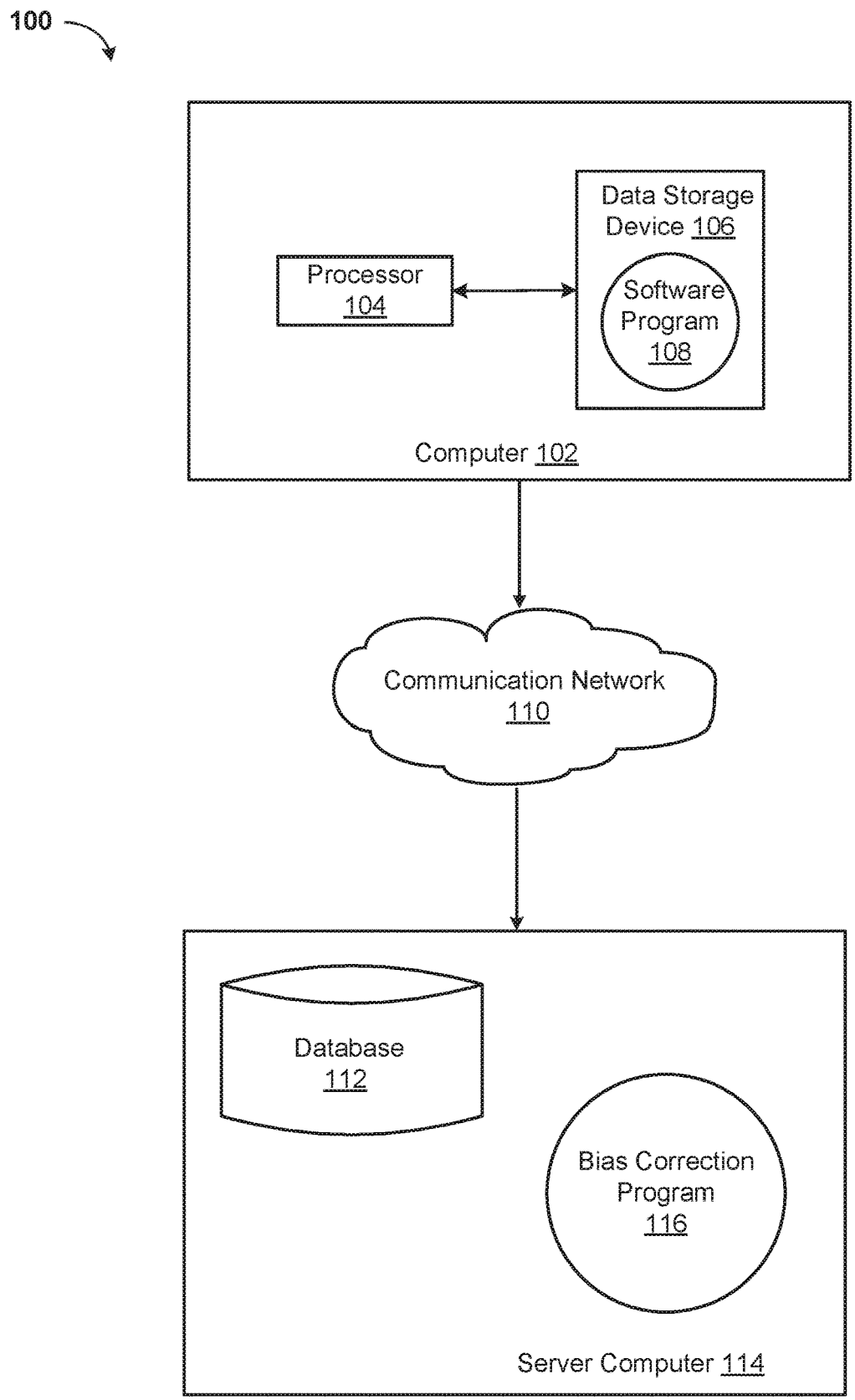
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of computing, and more particularly to machine learning. The following described exemplary embodiments provide a system, method and computer program to, among other things, identify, explain, and correct biases in weather forecasts. Therefore, some embodiments have the capacity to improve the field of computing by allowing for generation of data that explains sources of error and biases in weather forecasts over time. For example, the system, method, and computer program describe herein may allow a computer to correct error in weather and climate forecasts related to accumulated systematic errors; errors in observation; and phenomenon not accounted for, not described sufficiently, or entirely unknown.

As previously described, weather and climate models use quantitative methods to simulate the interactions of the important drivers of climate, including atmosphere, oceans, land surface and ice. For example, the weather and climate models may be numerical models that may be mathematical models of the atmosphere and oceans to predict the weather based on current weather conditions.

The models are used for a variety of purposes from study of the dynamics of the climate system to projections of future climate. For example, weather and climate models may use oceanic and atmospheric data from a variety of sources, including weather station data, satellite data, forcing factors, boundary conditions, and reanalysis data to generate forecasts.

However, climate models often have inherent biases as a result of accumulated errors in the representation of the many processes that are being simulated at different spatial and temporal scales. Biases are also not stationary over time. A consequence of this is that biases are difficult to identify, quantify and correct, not to mention making the connection to possible underlying natural/physical phenomena that can contribute to such biases. To improve climate projections, design robust bias adjustment methods, and derive uncertainty estimates, better understanding of the physical processes leading to biases may be necessary.

It may be advantageous, therefore, to use machine learning and explainable artificial intelligence (XAI) techniques to identify climate variables for sources of bias that arise from natural phenomena. This may allow for an assessment of how much benefit could be gained by specific improvements (e.g., higher resolution in regional climate models (RCMs) or better synoptic circulation in general circulation models (GCMs)), a better understanding of why some biases remain after bias adjustment, and the design of more robust bias adjustment methods that are not purely empirical but account for known process misrepresentations and can deliver major insights into the quality of process representation by climate models.

Data is collected from a global network of real-time monitoring weather stations. These in-situ observations are used to produce reanalysis data (thought of as observational maps where gaps in space and time have been filled in using a model). Reanalysis data is used as initial conditions for weather/climate forecast models, which in turn produce spatio-temporal (ST) forecasts over a given forecast horizon (lead time). Additional metadata is also used such as various parameterization assumptions, time of year, temporal, and spatial resolution, etc. These forecasts are often made publicly available or are provided to clients.

Forecasts are not always perfect, and the errors can be calculated by comparing against ground truth reanalysis data. This can be done for historical forecasts for which ground truth data as well as forecasted data may be available. Errors may be calculated over long time periods or under specific conditions. Consistent long-term or scenario-dependent errors can be thought of as biases, that are inherent in these forecast models and come as a result of either accumulated systematic errors in the model, possible errors or biases in the reanalysis data, or even physical phenomena or processes that aren't correctly accounted for in the differential equations, assumptions, or parameterizations. Even though the source of these biases can sometimes be obscure and hidden in the details and equations of the forecast model, it can become more apparent and understandable if these biases can be linked to the initial conditions and are combined with expert knowledge in the field. By training a ML model that takes as input the ST initial conditions used by a forecast model to produce a forecast run (a complete forecast spanning over all the forecast horizons), as well as any relevant meta-data, and produces as output the expected errors associated with a forecast, a link is established between a weather/climate model's initial conditions (reanalysis data) and the resulting forecast errors from the weather/climate model. An ML model should be able to identify important signals in the reanalysis data that leads to accurate prediction of forecast errors, if such a link exists.

However, in order to find out what regions, variables, and time-steps of the input data (initial conditions) the ML model focused on most in order to predict the correct forecast errors, explainable AI (XAI) techniques such as Layer-wise Relevance Propagation (LRP) and Optimal Input (OI) may be applied. This produces as heatmap of the same shape, size, and dimensionality as the ML inputs, that indicates what regions, variables and time steps of the input data contributed most to the resulting output for a given input & output pair example. The resulting heatmap may point to possible biases in the reanalysis data (e.g., arising from under-observed regions), or it can point to phenomena present in the data, but not sufficiently accounted for by the forecast model.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The following described exemplary embodiments provide a system, method and computer program that identifies, explains, and corrects biases in weather and climate models. Referring now to FIG. 1, a functional block diagram of a networked computer environment illustrating a bias correction system 100 (hereinafter "system") for identifying, explaining, and correcting biases in weather and climate models. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 5 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 6 and 7. The server computer 114 may also be located in a cloud computing deployment model, such as a private cloud, community cloud, public cloud, or hybrid cloud.

The server computer 114, which may be used for identifying, explaining, and correcting biases in weather and climate models is enabled to run a Bias Correction Program 116 (hereinafter "program") that may interact with a database 112. The Bias Correction Program method is explained in more detail below with respect to FIG. 4. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger bias correction program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
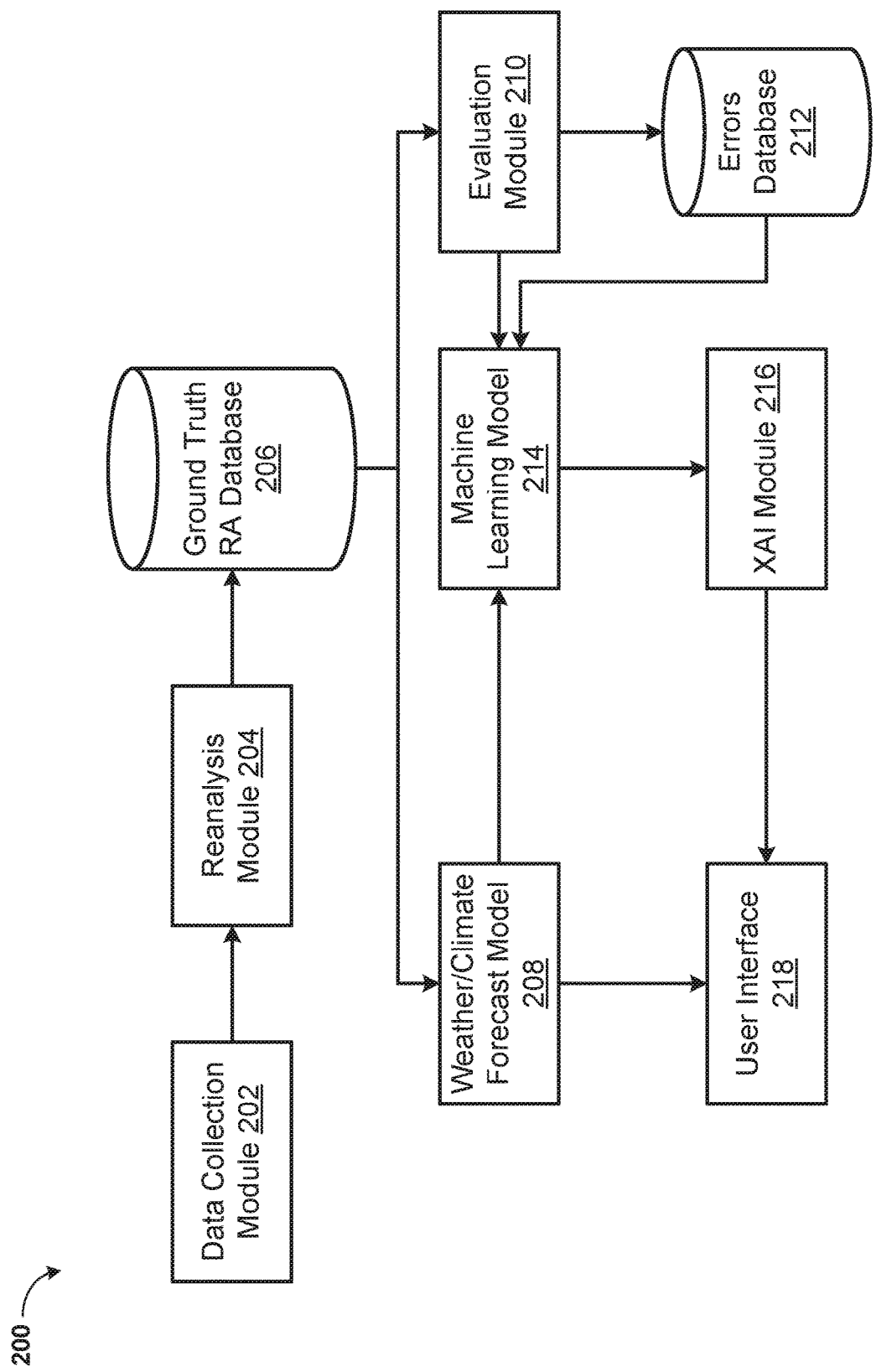
FIG. 2 is a block diagram of a system for identifying, explaining, and correcting biases in weather forecasts, according to at least one embodiment.

Referring now to FIG. 2, a block diagram of a system 200 for identifying, explaining, and correcting biases in weather forecasts is depicted, according to at least one embodiment. The system 200 may include, among other things, a data collection module 202, a reanalysis module 204, a ground truth reanalysis (RA) database 206, a weather/climate forecast model 208, an evaluation module 210, an errors database 212, a machine learning (ML) model 214, an explainable artificial intelligence (XAI) module 216, and a user interface 218.

The data collection module 202 may collect data corresponding to weather and climate, such as weather station data, satellite data, forcing factors, and boundary conditions, from a global network of real-time monitoring weather stations. For example, the weather stations may be used to detect, among other things, precipitation amounts, wind speed and direction, humidity, air temperature, soil temperature, and the like.

The reanalysis module 204 may construct initial conditions for one or more regions based on the collected data. For example, in-situ observations from the data collection module 202 may be used to produce reanalysis data (i.e., observational maps where gaps in space and time have been filled in using a numerical model). The reanalysis data may be used as initial conditions for the weather/climate forecast model 208, which in turn produce spatio-temporal (ST) forecasts over a given forecast horizon (lead time). Additional metadata is also used such as various parameterization assumptions, time of year, temporal, and spatial resolution. The reanalysis module 204 may store the reanalysis data in the ground truth reanalysis database 206.

The weather/climate forecast model 208 may access the ground truth reanalysis (RA) database 206 in order to generate weather and climate forecasts associated with given regions. However, it may be appreciated due to the complexity of predicting weather forecasts, the weather/climate forecast model 208 may include inherent biases as a result of accumulated errors in the representation of the many processes that are being simulated at different spatial and temporal scales. For example, the weather/climate forecast model 208 may include one or more weight values or coefficients that misrepresent one or more weather parameters or processes. Thus, the weather/climate forecast model 208 may inadvertently under-estimate or over-estimate forecast conditions (e.g., precipitation levels, temperature, etc.) based on the under-represented parameters due to incorrect assumptions regarding variables present within the weather/climate forecast model 208.

The evaluation module 210 may calculate the errors and biases present within the weather/climate forecast model 208 by comparing against the ground truth reanalysis data in the ground truth reanalysis database 206. For example, the evaluation module 210 may compare historical forecasts for which ground truth data is available to the forecast data generated by the weather/climate forecast model 208. The evaluation module 210 may store forecast error data in the errors database 212.

The machine learning model 214 may receive the initial conditions generated by the reanalysis module 204 and used by the weather/climate forecast model 208 to produce a forecast run (i.e., a complete forecast spanning over all the forecast horizons), as well as any relevant meta-data. The machine learning model 214 may generate the expected errors associated with a forecast. If a link exists between the reanalysis data and the forecast errors from a weather/climate model, the ML model should be able to identify and leverage such a link or pattern to correctly predict the errors.

The XAI module 216 may use one or more explainable AI techniques such as layer-wise relevance propagation and optimal input weighting in order to generate XAI data that may identify one or more parameters at one or more physical locations responsible for causing bias in the weather/climate forecasting model 208. For example, the XAI module may generate one or more heatmaps corresponding to regions (i.e., locations) in the reanalysis data that can be associated with forecasting errors that are likely or unlikely to cause larger, systematic bias within the weather/climate forecasting model 208. The XAI data can point to possible inherent biases in specific regions in the reanalysis data, and therefore also in the global in-situ monitoring network. The XAI data may also then be used to suggest under-observed regions on the globe. For example, the output heatmap from the XAI module 216 can point to possible over-simplification or misrepresentation of physical phenomena in the weather/climate forecast model 208 that causes the resulting biases. For example, where the in-situ data or reanalysis data is of a high fidelity, the source of bias can be related to parameterization of physical process.

The user interface 218 may receive forecast data from the weather/climate forecasting model 208 and may display the forecast data to an end user. The user interface 218 may additionally receive XAI data (e.g., heatmap) from the XAI module 216 and may display the XAI data to the end user.

Figure 3:
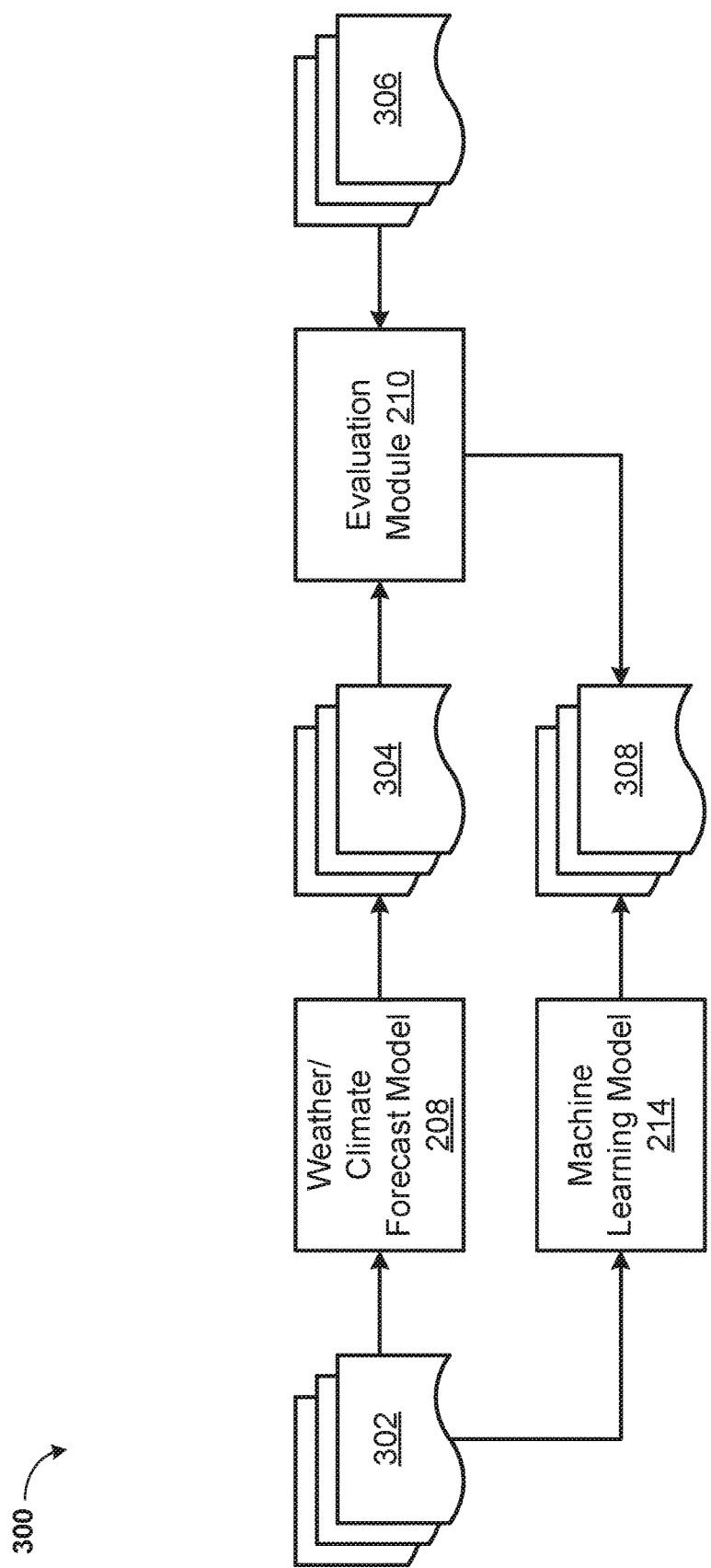
FIG. 3 is a block diagram of training of a machine learning model for identifying forecasting biases, according to at least one embodiment.

Referring now to FIG. 3, a diagram 300 of training of a machine learning system for identifying forecasting biases is depicted, according to at least one embodiment. The machine learning system of FIG. 3 may substantially correspond to the system 200 depicted in FIG. 2. The training of the system may involve, among other things, the weather/climate forecast model 208, the evaluation module 210, and the machine learning model 214, as depicted in FIG. 2.

The weather/climate forecast model 208 may receive initial conditions data 302 as input. The initial conditions data 302 may include, among other things, weather station data, satellite data, initial weather and climate conditions for a prediction period, reanalysis data, and delineation of forcing factors. The weather/climate forecast model 208 may compile forecast metadata for later use in error assessment. This metadata may include model composition relevant for systematic errors, including known parameterization deficiencies, and input data accuracy measurements, such as errors in observation/reanalysis data. The weather/climate forecast model 208 may additionally generate spatio-temporal forecast data 304.

The evaluation module 210 may receive the spatio-temporal forecast data 304 in addition to ground truth reanalysis data 306. The ground truth reanalysis data 306 may include, among other things, a time of year for forecasting, parameterization, boundary conditions, forecast time-steps, and temporal and spatial resolution of the forecast data. The evaluation module 210 may use the spatio-temporal forecast data 304 and the ground truth reanalysis data 306 to identify consistent errors in forecasts for a given region over a period of time as forecast biases using spatiotemporal clustering techniques associated with the spatio-temporal forecast data 304 generated by the weather/climate forecast model 208. Thus, the evaluation module 210 may compile forecast error spatial layers for each time instance in forecast horizon.

The machine learning model 214 may also receive the initial conditions data 302 as input. The machine learning model 214 may identify forecast errors as a target variable. The machine learning model 214 may be implemented as a three-dimensional convolutional neural network, a long-short term memory convolutional neural network, or any other suitable machine learning architecture. The machine learning model 214 may use predictors such as reanalysis data with climate input variables, such as humidity, soil temperature, air temperature, wind speed and direction, and precipitation amounts, in order to generate predicted forecast error data 308 for weather models. The predicted forecast error data 308 may be used to correct bias in the predictions of the weather models.

The trained machine learning model 214 can be leveraged to uncover the links that possibly exist between reanalysis data 302 and predicted forecast error data 308, using XAI techniques. For example, optimal input and layer-wise relevance propagation techniques may be applied in order to generate heat maps to indicate which regions (for each input variable) may have contributed to identified bias regions.

Figure 4:
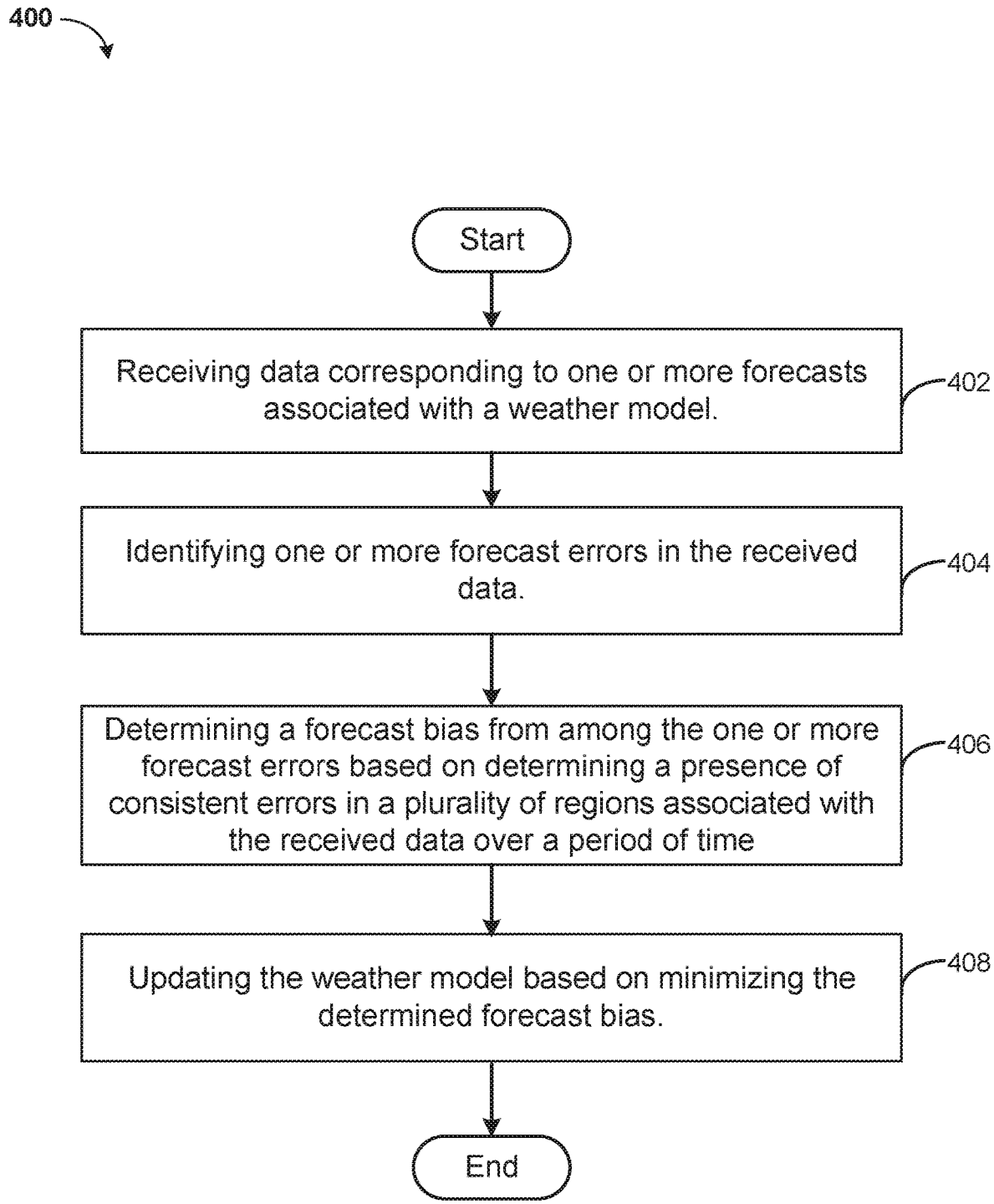
FIG. 4 is an operational flowchart illustrating the steps carried out by a program that identifies and corrects biases in weather forecasts, according to at least one embodiment.

Referring now to FIG. 4, an operational flowchart illustrating the steps of a method 400 carried out by a program that identifies, explains, and corrects biases in weather forecasts is depicted.

At 402, the method 400 may include receiving data corresponding to one or more forecasts associated with a weather model. The forecasts may correspond to predictions of future weather and climate data for a given location or region. In operation, the data collection module 202 (FIG. 2) may receive precipitation, temperature, and wind data from weather stations or from satellite data for locations or regions across the globe.

At 404, the method 400 may include identifying one or more forecast errors in the received data. The errors may be due to improper assumptions associated with weight factor or coefficient present within a weather or climate model. In operation, the weather/climate forecast model 208 (FIG. 2) may under-represent the importance of a given variable with regard to a weather event. Thus, the weather/climate forecast model 208 may make incorrect forecasts based on incorrect assumptions. The evaluation module 210 (FIG. 2), therefore, may identify errors within the weather/climate forecast model 208 based on comparing known historical data retrieved from the ground truth reanalysis database 206 (FIG. 2) to previous predictions in order to determine their accuracy and may store these errors in the errors database 212 (FIG. 2).

At 406, the method 400 may include determining a forecast bias from among the one or more forecast errors based on determining a presence of consistent errors in a plurality of regions associated with the received data over a period of time. Because errors may accumulate over time, the assumptions made with respect to parameters for one location or region may propagate throughout the model and may cause it to be inaccurate in generating forecasts beyond those of the location or region. In operation, the machine learning model 214 (FIG. 2) may identify a given parameter for a given region to be likely to be causing forecast errors based on data retrieved from the errors database 212 (FIG. 2).

At 408, the method 400 may include updating the weather model based on minimizing the determined forecast bias. In order to correct for the bias, likely errors may be identified on a heatmap as being primarily responsible for causing inaccurate forecasts. In operation, the XAI module 216 (FIG. 2) may create a heatmap of locations and regions with incorrect assumptions leading to bias. The weather/climate forecast model 208 (FIG. 2) may update parameters for regions displayed by the heatmap. Alternatively, the user interface 218 (FIG. 2) may display these heatmaps to an end user for manual correction.

It may be appreciated that FIG. 4 provides only an illustration of one implementation and does not imply any limitations with regard to how different embodiments may be implemented. Many modifications to the depicted environments may be made based on design and implementation requirements.

Figure 5:
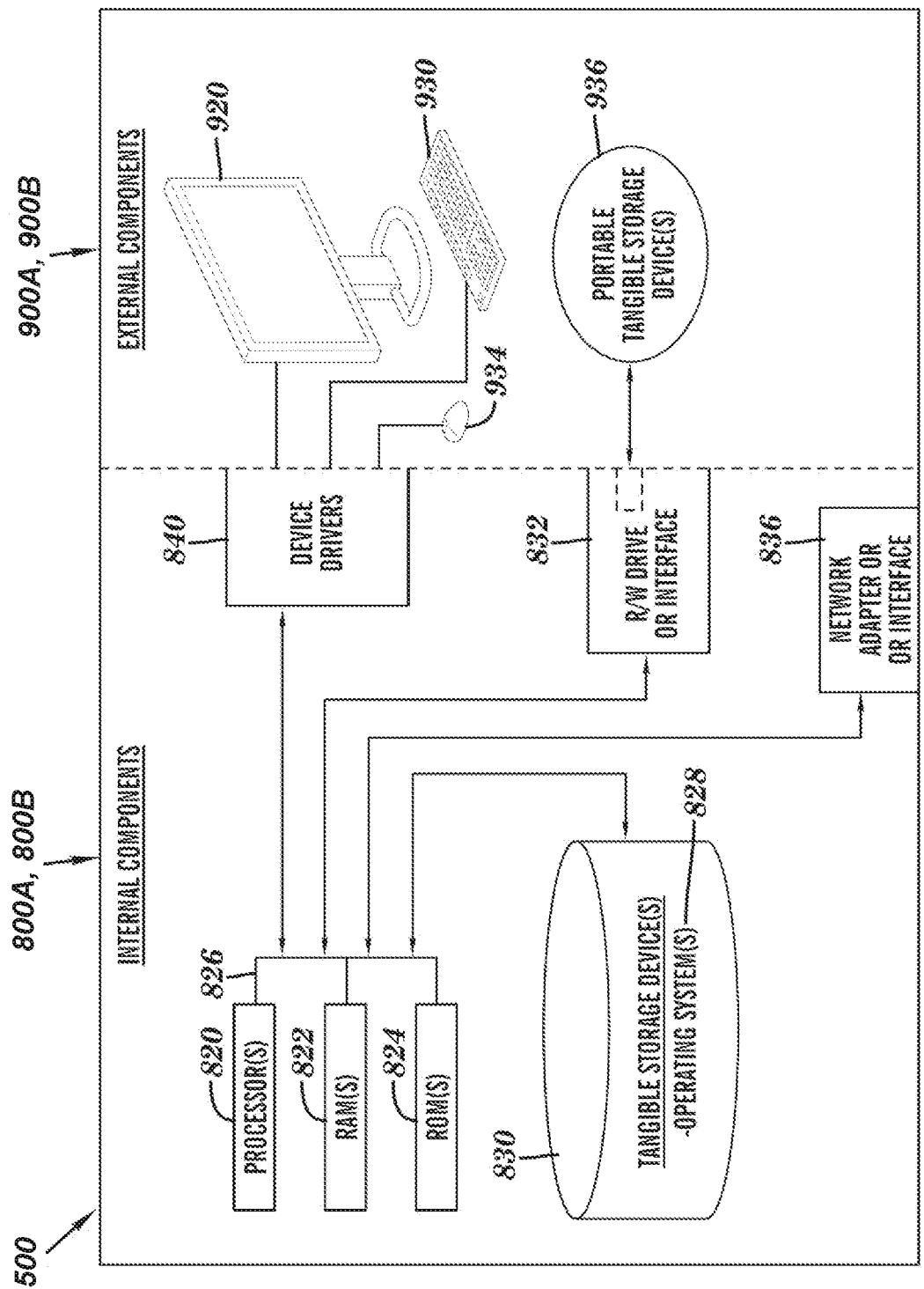
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment. It should be appreciated that FIG. 5 provides only an illustration of one implementation and does not imply any limitations with regard to the environments in which different embodiments may be implemented. Many modifications to the depicted environments may be made based on design and implementation requirements.

Figure 6:
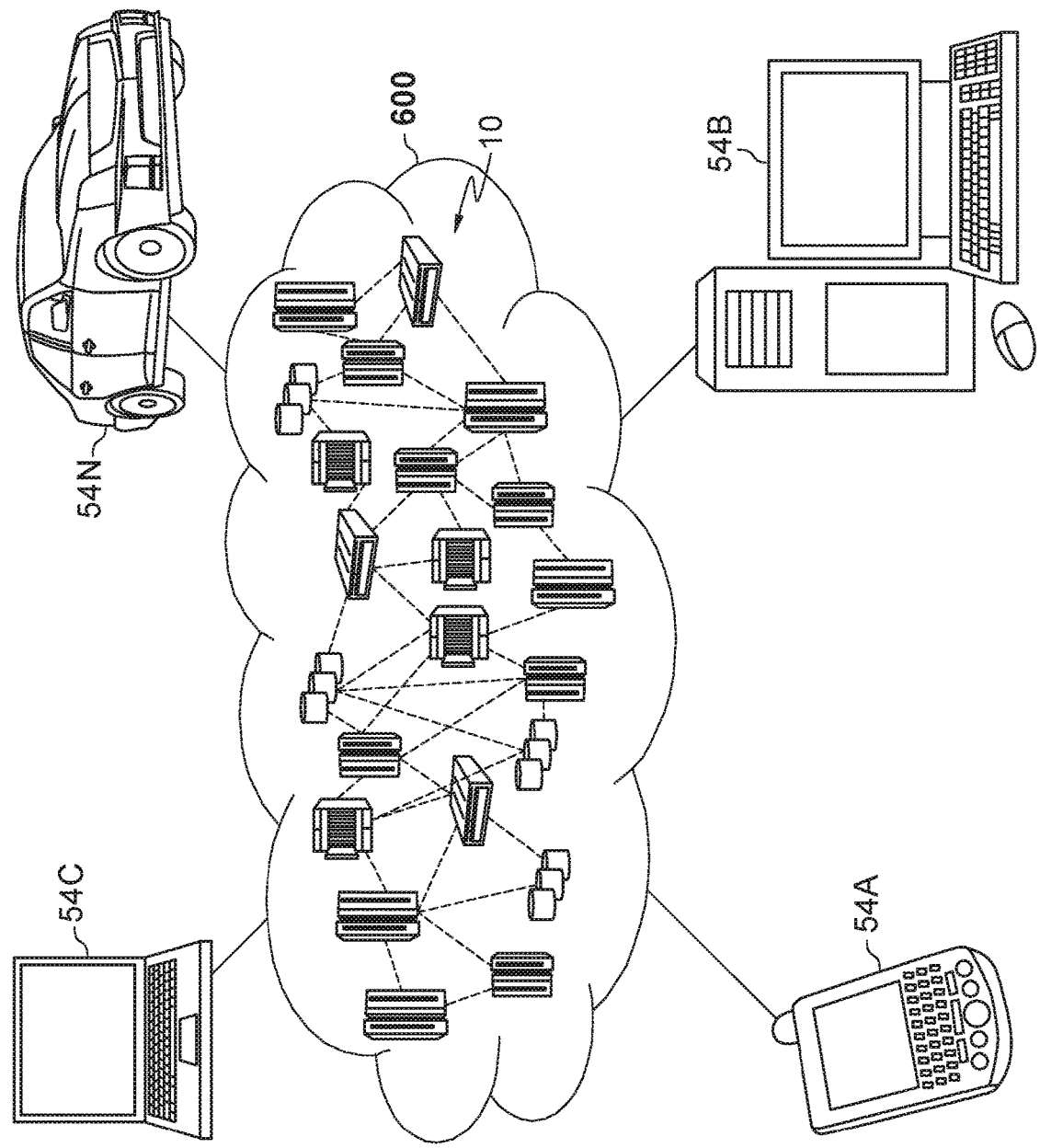
FIG. 6 is a block diagram of an illustrative cloud computing environment including the computer system depicted in FIG. 1, according to at least one embodiment.

Computer 102 (FIG. 1) and server computer 114 (FIG. 1) may include respective sets of internal components 800A,B and external components 900A,B illustrated in FIG. 6. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Bias Correction Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Bias Correction Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Bias Correction Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Bias Correction Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring to FIG. 6, illustrative cloud computing environment 600 is depicted. As shown, cloud computing environment 600 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 54A-N shown in FIG. 6 are intended to be illustrative only and that cloud computing nodes 10 and cloud computing environment 600 can communicate with any type of computerized device over any type of network and/or network addressable connection (e.g., using a web browser).

Figure 7:
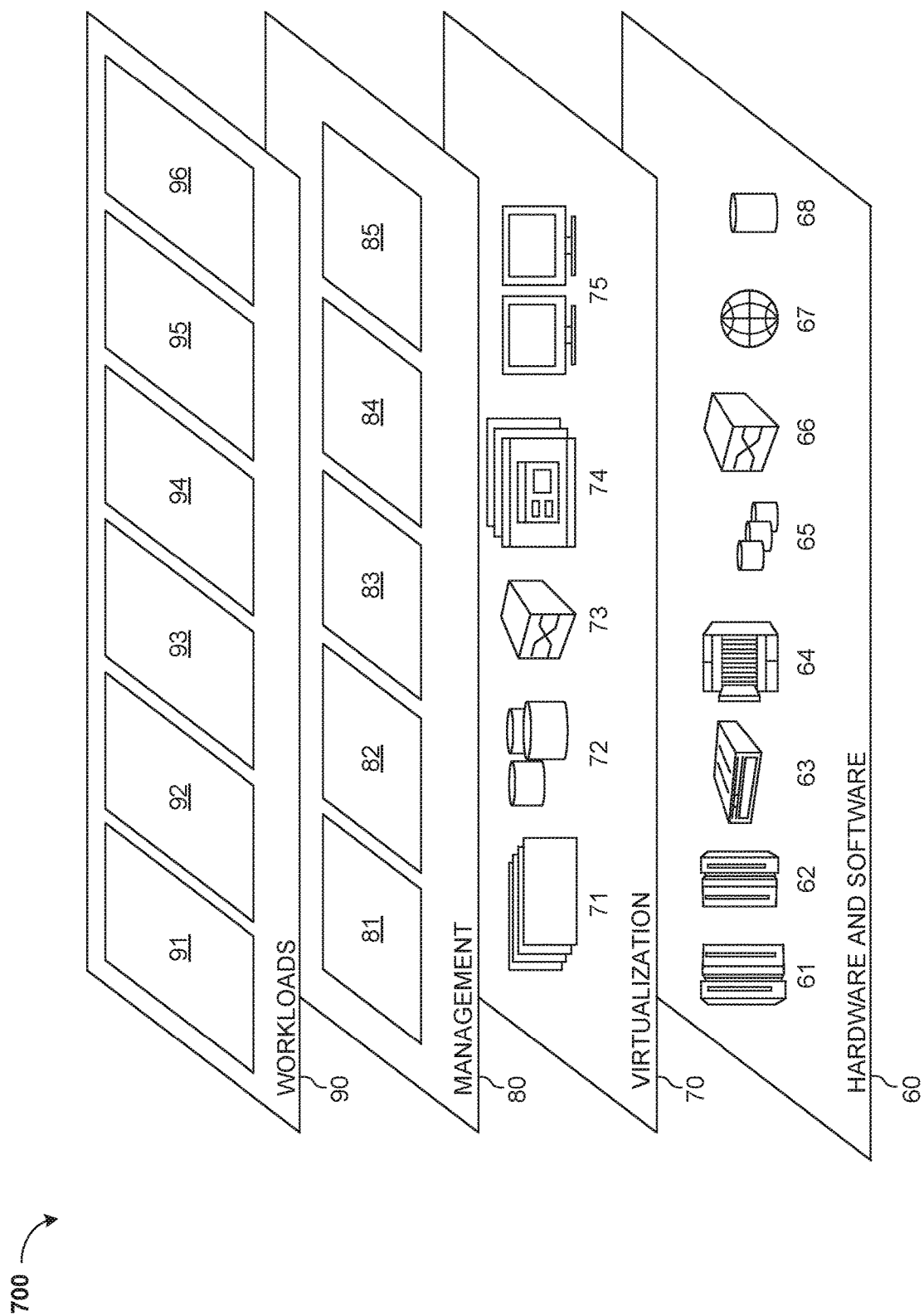
FIG. 7 is a block diagram of functional layers of the illustrative cloud computing environment of FIG. 6, according to at least one embodiment.

Referring to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Bias Correction 96. Bias Correction 96 may identify, explain, and correct biases in weather and climate models.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of identifying bias in weather models, executable by a processor, comprising:
   receiving data corresponding to one or more forecasts associated with a weather model;
   identifying one or more forecast errors in the received data;
   determining a forecast bias from among the identified one or more forecast errors based on determining a presence of consistent errors in a plurality of regions associated with the received data over a period of time;
   updating the weather model based on minimizing the determined forecast bias; and
   generating one or more heatmaps associated with the determined forecast bias, wherein the one or more heatmaps indicate one or more regions from among the plurality of regions corresponding to the identified one or more forecast errors.

2. The method of claim 1, wherein the one or more heatmaps are generated based on one or more explainable artificial intelligence (XAI) techniques.

3. The method of claim 2, wherein the XAI techniques comprise layer-wise relevance propagation and optimal input weighting.

4. The method of claim 1, wherein the weather model generates forecast data based on metadata comprising a time of year, one or more boundary conditions, one or more forecast time-steps, a temporal resolution, a spatial resolution.

5. The method of claim 1, wherein the identified one or more forecast errors are identified based on comparing the received data to historical forecast data.

6. The method of claim 1, wherein the received data comprises weather station data, satellite weather data, humidity, and soil temperature.

7. A computer system for identifying bias in weather models, the computer system comprising:
   one or more computer-readable non-transitory storage media configured to store computer program code; and
   one or more computer processors configured to access said computer program code and operate as instructed by said computer program code, said computer program code including:
     receiving code configured to cause the one or more computer processors to receive data corresponding to one or more forecasts associated with a weather model;
     identifying code configured to cause the one or more computer processors to identify one or more forecast errors in the received data;
     determining code configured to cause the one or more computer processors to determine a forecast bias from among the identified one or more forecast errors based on determining a presence of consistent errors in a plurality of regions associated with the received data over a period of time;
     updating code configured to cause the one or more computer processors to update the weather model based on minimizing the determined forecast bias; and
     generating code configured to cause the one or more computer processors to generate one or more heatmaps associated with the determined forecast bias, wherein the one or more heatmaps indicate one or more regions from among the plurality of regions corresponding to the identified one or more forecast errors.

8. The computer system of claim 7, wherein the one or more heatmaps are generated based on one or more explainable artificial intelligence (XAI) techniques.

9. The computer system of claim 8, wherein the XAI techniques comprise layer-wise relevance propagation and optimal input weighting.

10. The computer system of claim 7, wherein the weather model generates forecast data based on metadata comprising a time of year, one or more boundary conditions, one or more forecast time-steps, a temporal resolution, a spatial resolution.

11. The computer system of claim 7, wherein the identified one or more forecast errors are identified based on comparing the received data to historical forecast data.

12. The computer system of claim 7, wherein the received data comprises weather station data, satellite weather data, humidity, and soil temperature.

13. A non-transitory computer readable medium having stored thereon a computer program for identifying bias in weather models, the computer program configured to cause one or more computer processors to:
   receive data corresponding to one or more forecasts associated with a weather model;
   identify one or more forecast errors in the received data;
   determine a forecast bias from among the identified one or more forecast errors based on determining a presence of consistent errors in a plurality of regions associated with the received data over a period of time;
   update the weather model based on minimizing the determined forecast bias; and
   generate one or more heatmaps associated with the determined forecast bias, wherein the one or more heatmaps indicate one or more regions from among the plurality of regions corresponding to the identified one or more forecast errors.

14. The computer readable medium of claim 13, wherein the one or more heatmaps are generated based on one or more explainable artificial intelligence (XAI) techniques.

15. The computer readable medium of claim 14, wherein the XAI techniques comprise layer-wise relevance propagation and optimal input weighting.

16. The computer readable medium of claim 13, wherein the weather model generates forecast data based on metadata comprising a time of year, one or more boundary conditions, one or more forecast time-steps, a temporal resolution, a spatial resolution.

17. The computer readable medium of claim 13, wherein the identified one or more forecast errors are identified based on comparing the received data to historical forecast data.

* * * * *